United States Patent [19]

Drapeau

[11] 3,908,800

[45] Sept. 30, 1975

[54] ITEM SELECTING SYSTEM

[75] Inventor: Raoul E. Drapeau, Vienna, Va.

[73] Assignee: Scope Incorporated, Reston, Va.

[22] Filed: Apr. 12, 1974

[21] Appl. No.: 460,529

[52] U.S. Cl. .......... 186/1 R; 214/16.4 A

[51] Int. Cl.$^2$ .......... B65G 63/02

[58] Field of Search .......... 186/1 R, 1 B, 1 C; 214/16.4 R, 16.4 A

[56] References Cited

UNITED STATES PATENTS

| | | | |
|---|---|---|---|
| 3,447,699 | 6/1969 | Weir | 186/1 R X |
| 3,532,184 | 10/1970 | Blake | 186/1 B |
| 3,741,345 | 6/1973 | Saridis | 186/1 R |

*Primary Examiner*—Robert J. Spar
*Assistant Examiner*—George F. Abraham
*Attorney, Agent, or Firm*—John E. Benoit

[57] ABSTRACT

An item selecting system for aiding manual selection of specific items from their storage compartments. Means are provided for indicating the compartment to be selected from and the number of items to be selected. A plurality of cartons are brought to the indicated position for receiving the items which are to be selected. Means are provided to indicate which cartons are to receive the selected items. A computer is used to control the signals to the indicating means. A human operator performs the selection and distribution as directed by the indicating means.

2 Claims, 10 Drawing Figures a. PRE SORT
BATCH 16

| ORDER | ITEM/LOC | QTY |
|---|---|---|
| 1 | 426 | 3 |
| 2 | 62 | 1 |
| 3 | 121 | 6 |
| 3 | 118 | 2 |
| 4 | 121 | 4 |

b. POST SORT

| ORDER | ITEM/LOC | QTY |
|---|---|---|
| 2 | 62 | 1 |
| 3 | 118 | 2 |
| 3 | 121 | 6 |
| 4 | 121 | 4 |
| 1 | 426 | 3 |

PICKING SEQ

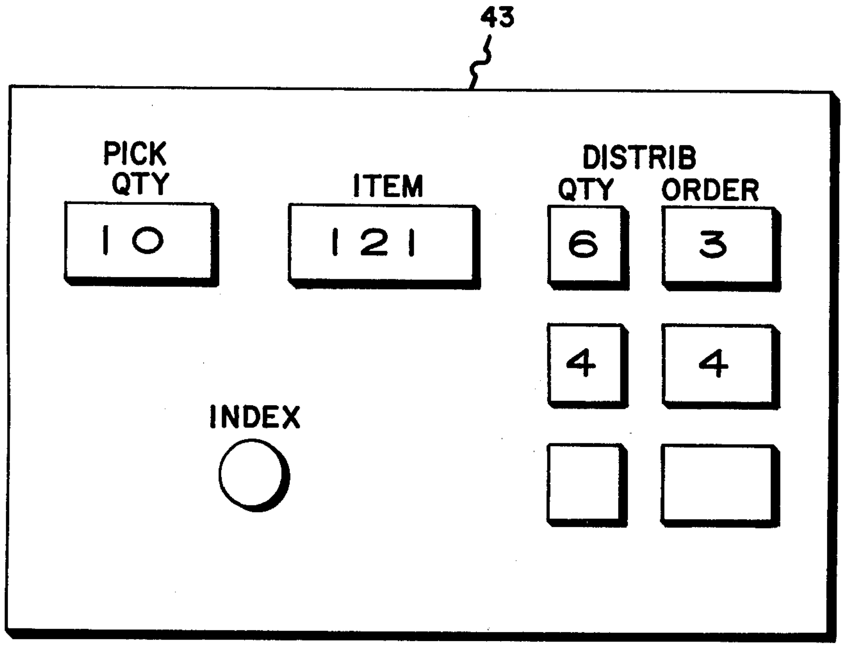
FIG. 7.
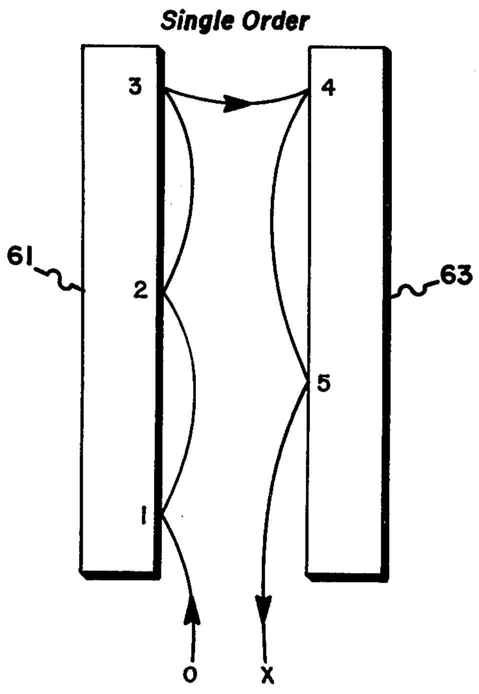
FIG. 8.a
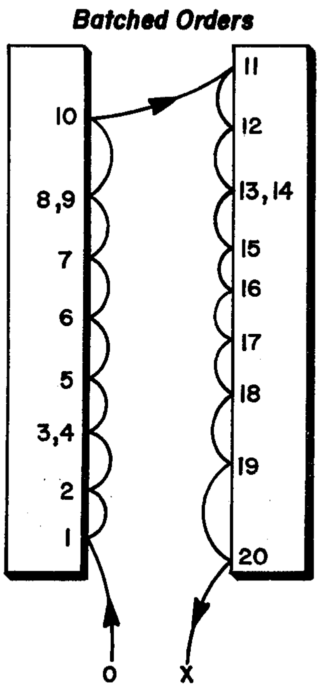
FIG. 8.b

ITEM SELECTING SYSTEM

The present invention relates broadly to item selecting systems and more specifically to a system including a stock carrying section and an order rack which is basically controlled through the use of a computer which gives visual indication to a person operating the system.

For many distribution industries, orders must be filled from stocks of a large number of different, physically small items. Current practice provides means whereby the devices for the improvement of the picking from stock of such small items involve mechanisms which are complicated and expensive. The major reason for this technical difficulty is the variety of package sizes and shapes, many of which do not lend themselves to mechanized handling.

The system of the present invention avoids these cost and design problems by retaining the human to perform the picking act. However, through the use of automatic controls together with various transport devices and indicators, there is provided a means for increasing throughput and accuracy significantly over purely unaided manual means.

The basic concept of the invention is that of sequencing the picking requirement for multiple orders and picking them concurrently. The picker is explicitly told by means of displays and indicators, one item at a time, which item to pick, how many to pick and then how to distribute the item to the various orders of the batch of orders which may be receiving it. With automatic control guiding the picker and his efforts, the result is greatly reduced lost time, fewer errors and hence improved efficiency. The one-at-a-time aspect of the visual display of picking requirements in the invention is very important, since earlier systems require the picker to scan printed forms for the same data such systems are obviously slower, more difficult and more error-prone.

Accordingly, it is an object of this invention to provide a mechaniszed system using a human operator guided by computer controlleed indicator lights for item storing and selecting.

Other objects of the invention will become apparent from the following description taken in conjunction with the drawings wherein FIG. 1 is a schematic front view of one form of picking cart used in the present invention;

FIG. 1*a* is a partial view of a display/memory unit;

FIG. 7 is an illustration of a further embodiment of the display panel; and

Figures 1, 1A:
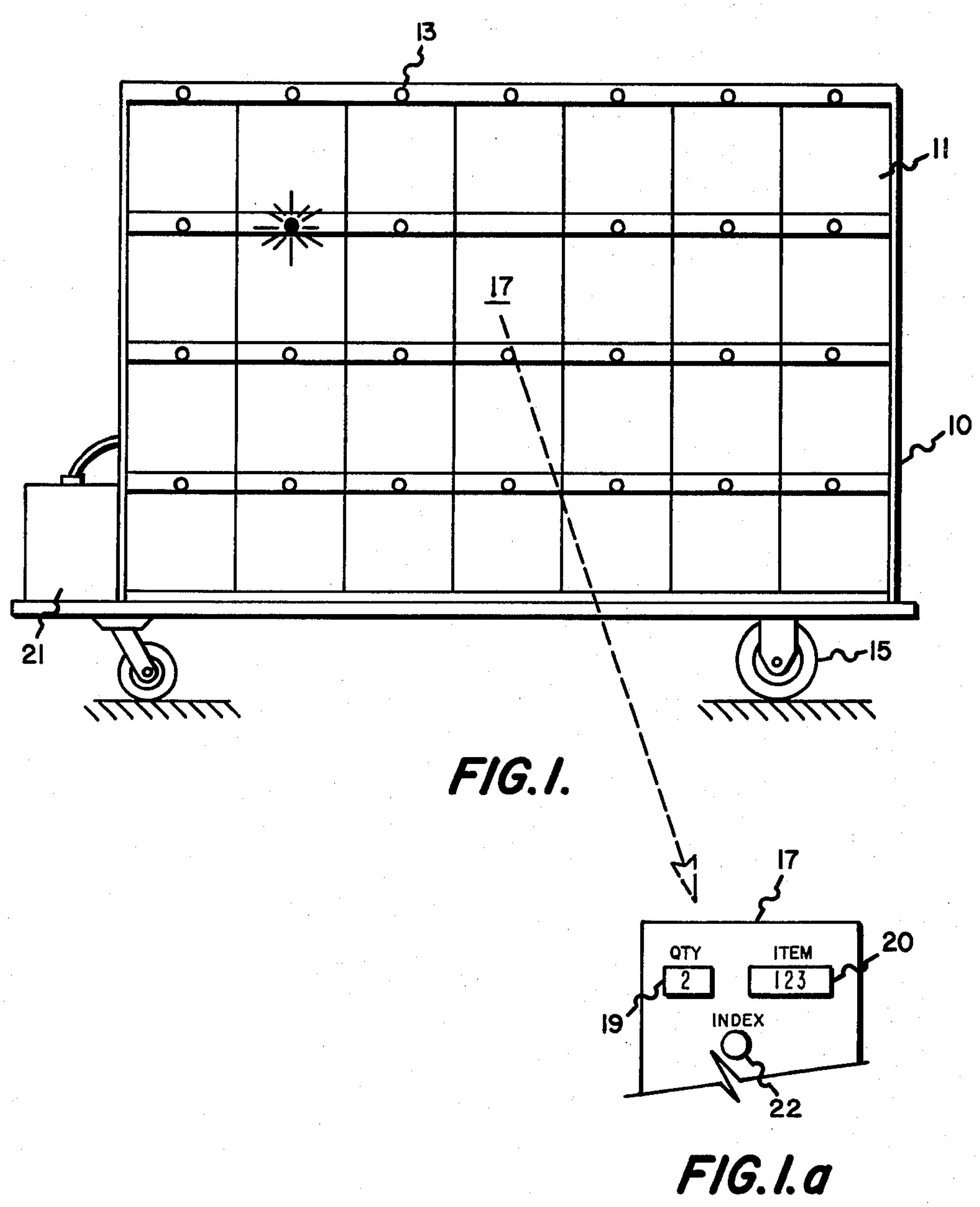

FIGS. 8*a* and 8*b* illustrate the movement of the human picker.

The principle of providing displays and indicators to guide the picker in performing his function in a sequenced manner has several important advantages. One such advantage is the improvement which observing illuminated displays provides as compared to visual scanning of hard copy pull sheets. One can expect fewer errors and more rapid operation using the displays of the present invention. A further advantage is the sequencing function wherein the items to be picked are presented one after the other so that the usual random item search is eliminated. Additionally, one "pass" through the stock passes by all the items to be picked for a "batch" of orders. In the same way, if the man follows a path among the stock aisles, then the sequencing is arranged so that in one transit he has passed by all the items required for that batch. In either case, the wasted efforts of walking, thinking and deciding are greatly reduced.

Broadly speaking, the present invention provides an item selecting system for aiding manual handling of specific items. A plurallity of compartments are provided with each compartment containing a plurality of like items. Visual means are provided for indicating a selected compartment and the number of items to be removed therefrom. A plurality of cartons may be provided, with a preselected customer's order of such items to be contained in at least one such carton, means are provided for indicating which carton(s) are to receive the items which have been removed from the compartment. A human stands in the preselected location to manually follow the orders given by a controller means such as a computer which provides the information to the indicating means.

There are industries such as pharmaceutical and automotive part distribution industries where the need for such automation is great, due to the large and ever changing number of package shapes.

The present invention is not related to the problem of effective stock picking by attempting to design a better physical picking or selection mechanism. Instead, since a human can pick varied sized items rapidly, accurately and inexpensively, he is retained to perform that particular function. This has proven to be a practical solution to the problem because analysis of picking operations indicates that the actual picking and pick distribution effort takes a very small portion of the picker's total effort. Rather, most of his time is spent in walking, deciding and other lost time functions. Accordingly, the unique combination of mechanisms of the present invention serves the purpose of eliminating a great portion of the wasted time involved in walking, deciding and the like.

One way to improve the picking throughput is to reduce the amount of walking by means of sequencing the individual items which constitute an order as regards to their location on particular shelves or compartments. This is a technique which is already employed in both manual and automatic picking and forms a part of the present invention as well.

The logical extension to sequencing would be to include two or more orders. This provides a further improvement more or less in proportion to the number of orders being picked concurrently. However, as the number of concurrently picked orders increases, in prior operations the difficulty of keeping the order requirements separated also increases and affects the improvement. It is in these areas wherein the present invention provides a major improvement.

Referring now to the present invention, a preferred embodiment of which will be described in detail, the picking operator is told which items and how many items to pick and where to place them thereby removing that particular burden from the picker. This information is provided to the operator through the use of displays controlled by data stored in a memory device which data was originally generated by a computer. Such an approach makes practical the picking of multiple concurrent orders. The walking time is also greatly reduced and made more organized over a group of orders by the order filler picking each item in sequence, that is with no back-tracking. This sequential picking path is governed by the system computer. In this manner, the human is guided in sequence to the stock. The sequencing of all items for a complete group of multiple orders is performed by the computer in accordance with their individual warehouse locations, which are either provided as input data stored in the computer or implied by the item number.

Further, because multiple orders are being picked, the stock picker need only move a small amount between successive picks. In most practical situations, the amount of walking between successive picks is reduced approximately in proportion to the number of orders in the batch.

It is to be understood that the specific location of the indicators and displays will be varied with the particular picking situation and requirements and may take a different form than that which is schematically indicated herein.

After the operator has picked the number of items from the designated compartment, he must distribute those items to the proper customer order as indicated by the distribution indications. This is accomplished by turning about and facing the order cart.

After the operator has picked his required items and distributed them, he advances the memory/display unit to the next pick and notes its display and returns to a position facing the shelves for the next item.

It is to be understood that since, through the memory unit, the computer can point out a particular item and quantity, that the same mechanism can be used for replenishment or restocking. In the case of replenishment, the cart memory is provided with data in accordance with the the restocking needs which are put into it through the input data line. The computer also directs the worker as to which items should be placed in which cartons. It then directs the operator to stop at each location needing replenishment, and through the same displays as used when picking, advises the operator into which location he should place the items which have been removed from the stock back-up supply and delivered to the picker location.

It is to be also understood that the above description and drawings are illustrative only, since the various specific components of the system could be varied and other components substituted therefor without departing from the invention as described.

One method of implementing computer-guided stock picking employs a cart 10 such as illustrated in FIGS. 1 and 1*a* wherein the assemblage of cubby holes 11 which hold the order cartons and which contain the distribution indicators 13 is made mobile and a "train" of one or more of these carts can be assembled. Carts 10 may include wheels 15 so as to facilitate the pushing or pulling thereof, or alternatively, they may be non-wheeled and carried about by some material transport mechanism such as a conveyor (not shown). This mobile cart also has attached thereto the display/memory unit 17 containing the picking quantity display 19 (how many to pull) and a display 20 guiding the picker to the specific item type to be picked (e.g. its stock No., location, etc.). The distribution indicators can be numeric displays where the probability of splitting a single pick among several orders in various quantities is high. In other cases, it can be simplified to merely a lamp, indicating distribution to that compartment or not. The index button 22 advances the indicators to the next pick as explained below.

While FIG. 1 shows one form of implementing the order cart wherein the compartments are cubbyholes, there will be instances where their form must be quite different depending on the physical parameters of the stocked items. Generally, each compartment will equate to one order. However, depending on the needs of the situation, there will be cases where the number of pieces (or volume) per order is such that the controller must assign more than one compartment to some orders. In FIG. 1*a* a simplified display panel is directing the operator to pick 2 pieces of an item identified as No. 123 (a warehouse location, for example). The single compartment indicator is instructing the operator to put both pieces in the one indicated compartment. There are many other indication arrangements depending on the needs of the application, such as having the same number of compartment indicators lit as pieces picked (here, two) meaning to put one of the two pieces picked in each of two separate compartments and so on.

Where the volume or weight of the items is relatively small, displaying the pick requirements of more than one pick at the same time further improves operational efficiency since the walking can be reduced if two or more picks are done on the same trip from cart to shelf.

If a tractor (not shown) is used to pull a train of carts it could be manually guided, or it could be made to follow a "track" (electrical or mechanical) and even start and stop automatically at the correct places where a pick needs to be made.

These mobile carts if operated singly, would preferably have their own electronics driven by a mobile power source 21 such as a battery.

The data which is read into the cart at the start of a batch is prepared by a computer device which organizes it in such a fashion that the cart electronics can be kept as simple as possible. Thus, the data from one pick for example, will contain the quantity, location and distribution details in a pre-arranged format so that the output drivers merely send each data field to the right place. The data can all be read in at once and stored internally as shown, or contained on a storage medium such as paper tape and read in one block (pick) at a time.

Figure 2:
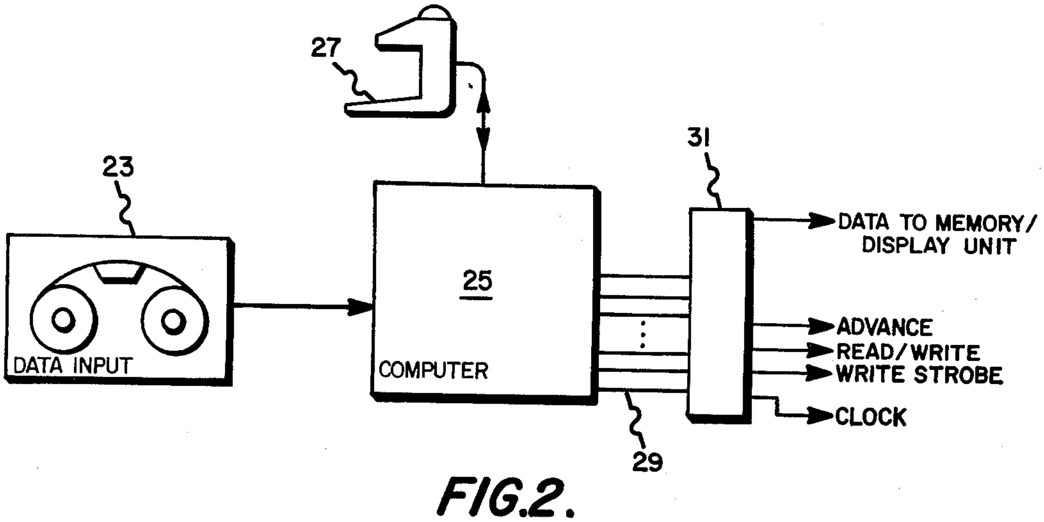
FIG. 2 is a schematic representation of a master unit used therein.

FIG. 2 illustrates the master unit which contains the essential data and which processes it for use by the control system.

The basic information is contained in a storage means 23 such as a magnetic tape, paper tape, card, or the like. The information on the tape is, of course, prepared in accordance with current customer orders.

The computer 25 which provides the formatted data to the carts provides the means for formatting sequencing and batching the raw data provided by storage means 23. The computer may be any general or special purpose computer capable of communicating with the data input peripheral from storage means 23 and control terminal 27 so as to perform a sort of warehouse locations and other tasks associated with organizing the data in a form suitable for transfer to the memory/display unit, FIG. 3. The computer has a data input/output bus and control lines 29 for interconnection with the memory/display unit.

The control terminal 27 is the means by which operating statistics, parameter changes, batch number selection and the like are communicated. It may take the form of a usual computer peripheral such as a Teletype or a special purpose device such as a series of switches and displays especially designed for the particular application.

Figure 3:
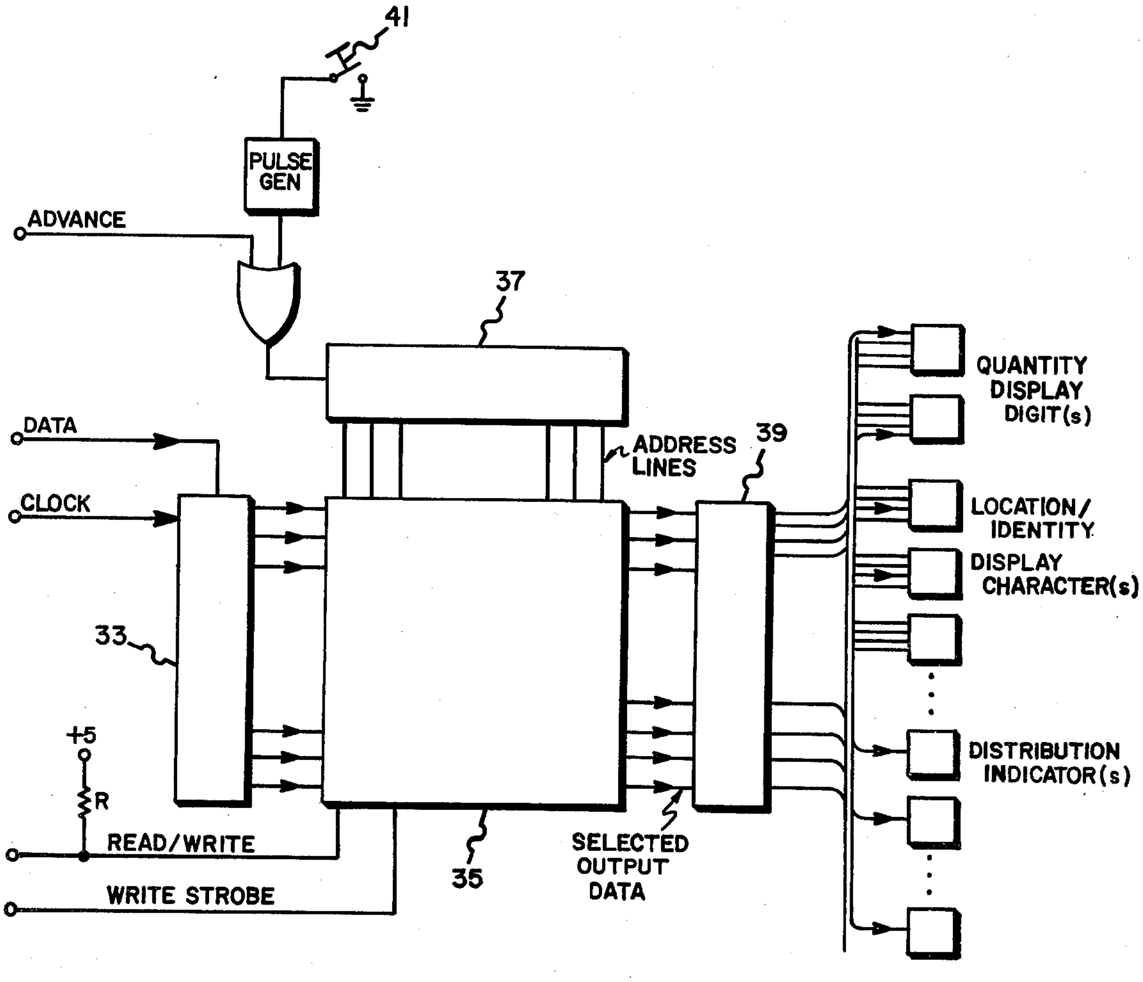
FIG. 3 is a schematic display of a memory/display unit.

When the master unit of FIG. 2 is connected to the memory display unit, FIG. 3, the read/write line is held in the write condition, one word of data is clocked into the shift register 33 and written by a strobe into the memory 35. The memory is then advanced to the next word position by an "Advance" pulse and the process repeated until the memory is full with all data describing the batch to be picked. One "word" of this data is sufficient to describe the display condition for an Index position; usually a pick and its distribution information. When picking, the Index switch advances the address counter 37 one position which selects the next memory address thereby placing the next word's data on the indicator drivers 39.

The specific data making up a word will depend on the form which the displays take, but typically there are four bits for each numeric display digit and one bit for each carton indicator.

Not shown is a return line from the memory which will permit the non-destructive readout back to the computer of loaded date for verification.

After each pick, the operator touches the "Index" button 41 which causes the information for the next pick to be displayed in place of the previous one. By using a counter with both forward and reverse capability, the operator may display previous pick data as well. In the case of automatic tractor movement, it also causes indexing of the train to the next "stop". This mechanical indexing can be done after distribution of the current pick, or during it to save time, depending on the organization of the controlling logic.

It should be noted that if the data is to be read directly from a tape or the like, the memory of FIG. 3 would not be required.

Figures 5, 6:
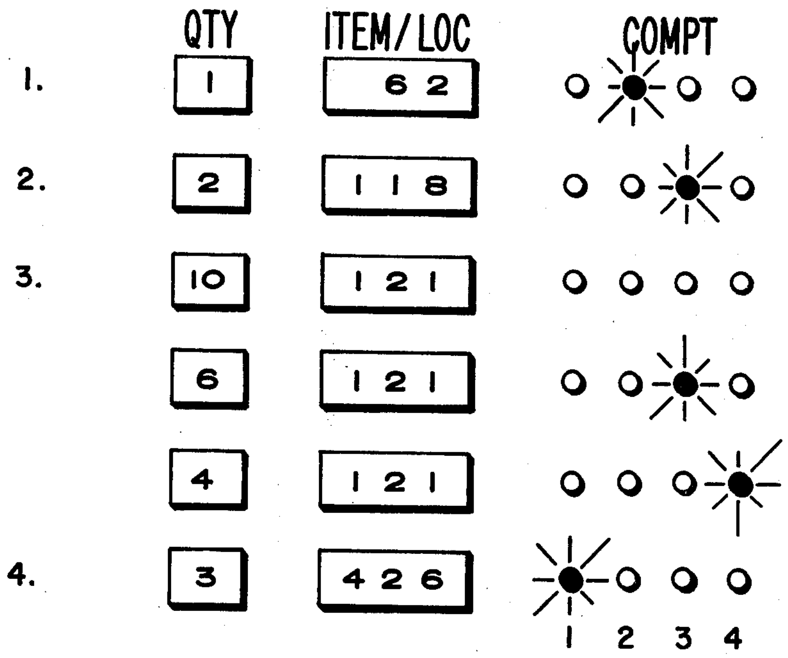
FIGS. 5 and 6 are charts showing the batching and picking process.

The program necessary to accomplish the batching, sequencing and so forth will depend on the needs of the situation, but in its simplest form, must merely follow rules of laying out the shortest route for the picker to follow in satisfying the picking requirements of the batch. This is done based on a knowledge of the warehouse location of all items. FIG. 5 depicts the operation procedure logical flow for a typical implementation of the technique. The memory display unit and the disconnect therefore may be eliminated in those cases where the memory/display unit is not free-standing, but remains connected to the master unit receiving its operating power and data by direct, permanent connection.

The batching strategy may be simple as in grouping orders in sets of a fixed number such as 50, or more complex as is required in situations where the volume of each order varies substantially and the computer must assign a different number of cartons to various orders, thereby resulting in a non-constant number of orders per batch.

Figure 4:
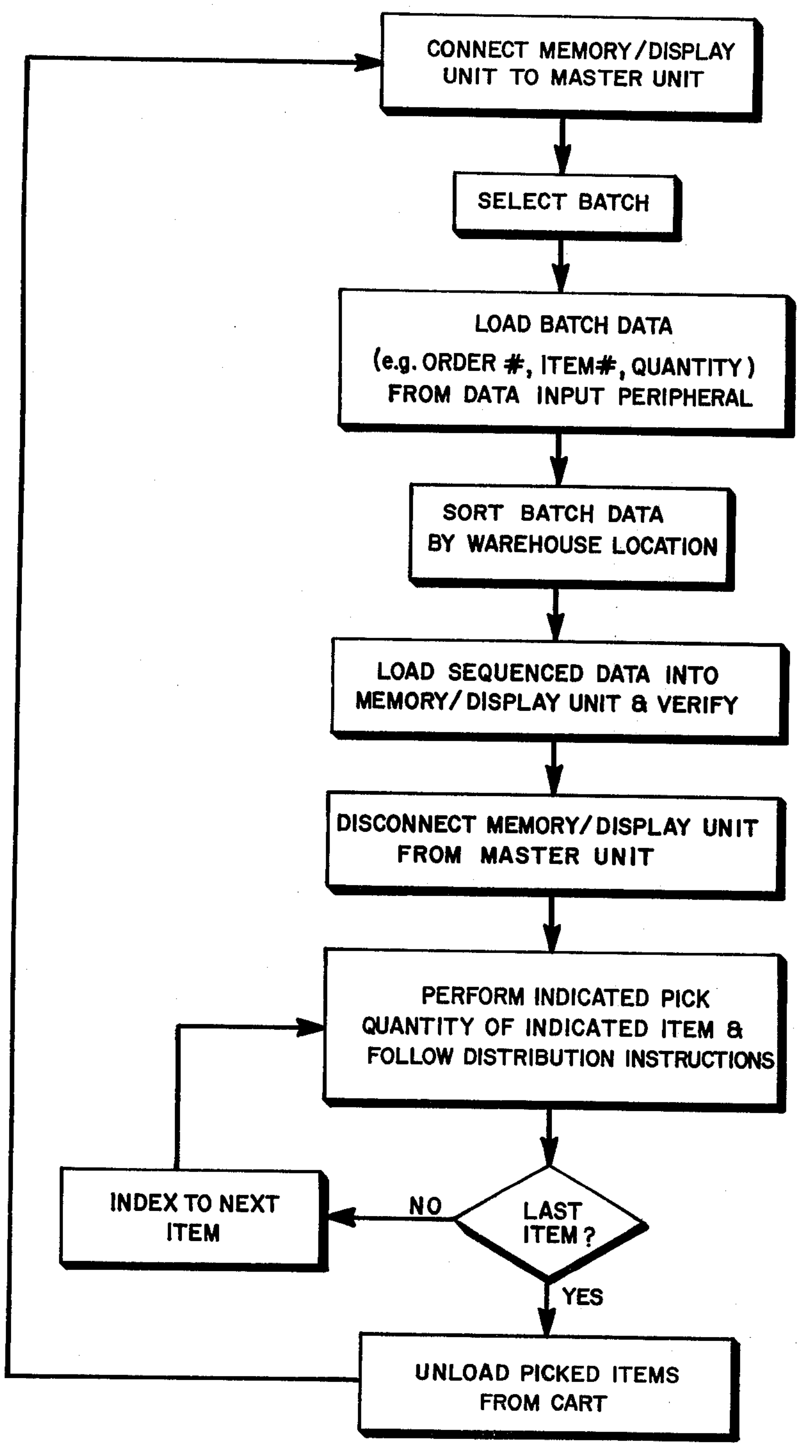
FIG. 4 is a schematic representation of one sequencing strategy which may be used in the present invention.

FIG. 4 shows a sequencing strategy used for a sample four (4) order batch; first in original pre-sorted sequence, and then in warehouse location sequence.

FIG. 6 depicts one form of display (single distribution) of the information, sequenced in FIG. 5. Each picked item, with the exception of the third is distributed to just one order carton and the pick quantity is displayed concurrently with its distribution location. The third pick is to be distributed to more than one order carton, so the first distribution instruction is displayed on the first index after the pick instruction, the next one the second and so on until all picked items of the same kind have been distributed.

FIG. 7 depicts one form which the self-contained display may assume when a plurality of orders requiring the same items are to be filled simultaneously. As can be seen, the total quantity of the item to be picked is shown in the same manner as indicated in FIG. 1*a*. Additionally, there are indicators for a plurality of orders together with indicators relating to the number from each order. In the illustrated example, 10 of item 121 is picked with 6 being placed in order number 3 and 4 being placed in order number 4.

The display panel may take many forms and may be more complex, having provisions for forward and backward indexing, displays for memory unit status, e.g. "LAST ITEM", "BATTERY LOW" etc.

This indicating module may be portable and not a part of either the cart or stock shelves, whereby a plurality of modules may be attached to the cart or attached to the stock shelves. In this configuration, the cart does not have distribution indicators adjacent to each order carton, but is passive, having an identification painted at each order carton location on the cart. FIG. 8 is illustrative of the movements of a human picker when picking a single order and when picking a batched order.

In FIG. 8*a* the order has been organized so that the items are in order relative to their location of the storage, shelves 61 and 63. Accordingly, the picker follows the path indicated by the arrows through stations 1–5.

In FIG. 8*b* the plurality of orders has been arranged as indicated in FIG. 5. The picker then proceeds in the direction of the arrows to fill all of the orders in the batch through stations 1–20.

As can be seen, in both of the situations illustrated in FIG. 8, the picker does not backtrack or move back and forth between storage shelves. Thus, the most efficient picking operation has been performed.

It is to be understood that the above description and accompanying drawings are illustrative only. Accordingly, the invention is to be limited only by the scope of the following claims.

What is claimed is:

1. An item selecting system for aiding manual handling of said items by a human operator comprising
   - a computing means for reading a batch of customer order data including item identity and quantity and arranging said data in warehouse location sequence;
   - a memory unit means coupled to said computing means for reading and storing said sequenced data;
   - display means coupled to said memory for displaying total pick quantity and item location and other identity;
   - a cart having a plurality of compartments equal in number or greater than the number of orders in the batch and associated distribution indicators for identifying the quantity thereof for each of said identified compartments; and means coupling the output of said memory unit means to said distribution indicators.

2. The selecting system of claim 1 further comprising a control terminal for activating said computing means.

* * * * *